3,020,708
ROCKET PROPELLANTS AND THEIR
UTILIZATION
John E. Mahan, Bartlesville, Okla., assignor to Phillips Petroleum Company, a corporation of Delaware
No Drawing. Filed Jan. 2, 1951, Ser. No. 204,075
18 Claims. (Cl. 60—35.4)

This invention relates to rocket propellants. In one embodiment this invention relates to hypergolic fuels and their application to the propulsion of rockets.

My invention is concerned with new and novel rocket propellants and their utilization; a rocket or jet propulsion device, being defined herein as a rigid container for matter and energy so arranged that a portion of the matter can absorb the energy in kinetic form and subsequently be ejected in a specified direction. The type rocket to which my invention is applied is that type of jet propulsion device designated as a "pure" rocket, i.e., a thrust producer which does not make use of the surrounding atmosphere. A rocket of the type with which my invention is concerned is propelled by introduction of a propellant material into a combustion chamber therein, and burning it under conditions that will cause it to release energy at a high but controllable rate immediately after entry into the combustion chamber. Rocket propellants, as liquids, are advantageously utilized inasmuch as the liquid propellant material can be carried in a light weight low pressure vessel and pumped into the combustion chamber, the latter though it must withstand high pressure and temperature, being only necessarily large enough to insure combustion. Secondly, the flow of liquid propellant into the combustion chamber can be regulated at will so that the thrust, continuous or in intermittent bursts of power, can be sustained, the latter type of liquid propellant flow contributing to a longer life of the combustion chamber and thrust nozzle. Various liquids and liquid combinations have been found useful as rocket propellants. Some propellants consist of a single liquid, and are termed "monopropellants." Those propellants involving two liquids are termed "bipropellants" and normally consist of an oxidizer and a fuel. Hydrogen peroxide and nitromethane are each well known monopropellants. Well known bipropellants include hydrogen peroxide or liquid oxygen as the oxidants with a hypergolic fuel component such as ethyl alcohol-water, ammonia, hydrazine, or hydrogen; and nitric acid as the oxidizer with aniline or furfuryl alcohol as hypergolic bipropellant fuel components.

When employing 100 percent nitric acid, i.e., "white fuming nitric acid" as the oxidizer in a rocket bipropellant, it is often necessary, dependent on the specific fuel component, to make ignition more prompt by dissolving from 6 to 14 percent of nitrogen dioxide in the white fuming nitric acid forming thereby "red fuming" nitric acid. A fuel component of a bipropellant material of the type described herein, is spontaneously ignited upon contacting the oxidizer, and for that reason is referred to herein as being "hypergolic." A ratio of oxidizer to hypergolic fuel based on stoichiometric amounts can be utilized within the limits of 0.5:1 to 1.5:1 if desired, the efficiency of the combustion being less at ratios below 1:1 and the use of the oxidizer being less economical at ratios above 1:1. However, practical consideration may necessitate the use of higher ranges, even as high as 6:1.

An object of this invention is to provide new rocket propellants. Another object is to provide hypergolic fuels. Another object is to provide a method for producing immediate thrust to a rocket. Another object is to provide unsaturated organic amines as fuel components of rocket bipropellants. Other objects will be apparent to those skilled in the art from the accompanying discussion and disclosure.

In accordance with a broad embodiment of my invention I have provided rocket bipropellant materials, the fuel components of which are at least one organic amine selected from the group consisting of an amine product of amination of 1,3-butadiene with ammonia, having a molecular weight higher than that of tributenylamine and an amine characterized by the structural formula

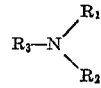

wherein $R_1$, $R_2$, and $R_3$ are radicals, each selected from the group consisting of alkenyl, aryl-alkenyl, alkaryl-alkenyl, cycloalkyl-alkenyl and cycloalkenyl-alkenyl, each said alkenyl radical containing at least 4 carbon atoms, wherein $R_1$ and $R_2$ can each additionally be hydrogen, wherein $R_1$ can additionally be selected from the group consisting of aryl and alkaryl, and wherein the total number of carbon atoms does not exceed 25. The open-chain radicals may be either straight or branched chain in configuration. These unsaturated amine compounds are hypergolic per se, and are also hypergolic when diluted with nonhypergolic combustible materials even in a state of dilution as high as 80 to 90 percent, or in some cases higher. Suitable non-hypergolic diluents include pure hydrocarbons, gasoline, jet fuel, and the like.

Illustrative of the hypergolic unsaturated organic amines of my invention are mono, di, and tributenyl-amines, mono and dibutenylaniline, mono and di-butenyltoluidine, mono and dibutenylxylidine, N-phenyl butenylamine, N-tolyl pentenylamine, 4-cyclohexenylpentenyl-amine, N-phenyl 3-cyclohexylpentenylamine, and the like.

The hypergolic compounds of my invention can be prepared in any suitable manner, one preparative method being disclosed in the copending application of J. E. Mahan and K. F. Bursack, Serial No. 135,290, filed December 27, 1949 now abandoned. As disclosed in that copending application, a conjugated hydrocarbon diene containing at least 4 carbon atoms in the molecule is reacted at a temperature of from 50 to 500° F. with ammonia or an organic amine in liquid phase in the presence of sodium hydride or sodamide as a catalyst, to form amination product comprising mono-, di-, and tri-alkenyl amines together with higher molecular weight amines, including amines unreactive with HCl to produce water-soluble hydrochlorides.

Illustrative of suitable amine reactants employed in forming the hypergolic unsaturated organic amines of my invention, as described in the copending application referred to above, include aniline, toluidines, xylidines, and ammonia. Illustrative of the diene reactants are 1,3-butadiene, hexadiene, isoprene (2-methyl-1,3-butadiene), piperylene (1,3-pentadiene), 1-phenyl-1,3-butadiene, 2,3-dimethyl-1,3-butadiene, 1,3-octadiene and the like.

Suitable oxidant compounds in addition to nitric acid acid can be used in the bipropellants of my invention, particularly other oxidants such as hydrogen peroxide, liquid oxygen and mixed acids, and particularly mixtures of nitric acid and sulfuric acid.

The advantages of this invention are illustrated in the following examples. The reactants and their proportions and their specific ingredients are presented as being typical and should not be construed to limit the invention unduly.

*Example I*

Each of the unsaturated organic amines described herein below was tested for spontaneous ignition, employing nitric acid as the oxidizer. In each test 0.13 ml. of a mixture of butenylamine and pure grade n-heptane was dropped into a 1" x 8" test tube containing 0.3 ml. of red fuming nitric acid. The amine and the nitric acid upon coming into contact with each other in the test tube ignited spontaneously in each of the tests. Pure grade n-heptane was employed as diluent to determine the maximum amount of dilution which a compound would tolerate and still retain its hypergolicity. Results of tests using mono, di, and tributenylamine are tabulated as follows:

| Compounds: | Maximum dilution percent n-heptane |
|---|---|
| Monobutenylamine | 40 |
| Dibutenylamine | 45 |
| Tributenylamine | 55 |

*Example II*

A butenylamine-containing reaction product was prepared in a 10.8 liter capacity autoclave by amination of 1,3-butadiene with ammonia under conditions to provide maximum yield of butenylamines. The amounts of materials charged were as follows:

| Materials charged: | Amount charged, grams |
|---|---|
| 1,3-butadiene | 2948 |
| Ammonia | 925 |
| Sodium hydride catalyst | 14 |

The reaction was conducted at 130° F. in liquid phase under the autogenic pressure of the reactants for a period of 3 hours. The conversion was 31.9 weight percent based on the weight of 1,3-butadiene charged. Distillation characteristics of the effluent reaction product, less unreacted ammonia and butadiene, were as follows:

| Product Fraction | Boiling Range | Weight, grams |
|---|---|---|
| Monobutenylamine | Up to 60°C. at 760 mm | 111.8 |
| Dibutenylamine | 60 to 98°C. at 22 mm | 45.3 |
| Tributenylamine | 98 to 121°C. at 22 mm | 501.2 |
| Higher boiling material [1] | 121° C. at 22 mm. to 195° C. at 2 mm | 341.5 |
| Residue | | 46.4 |

[1] Contains higher boiling amines including those unreactive with HCl to form a water-soluble hydrochloride.

It will be noted that obviously the higher boiling material hereinabove referred to has a molecular weight higher than that of tributenylamine.

The total effluent reaction product [2] from the above described run was hypergolic per se and was also hypergolic when diluted with pure grade n-heptane. The following total reaction effluent fractions, described below, were hypergolic per se and were also hypergolic when diluted with n-heptane. Hypergolicity tests of the total reaction effluent, formed as described, and of certain fractions thereof were conducted according to the procedure described in Example I using red fuming nitric acid as the oxidant. Results of these tests are tabulated as follows:

| | Maximum dilution percent n-heptane |
|---|---|
| 1. Total effluent reaction product [2] | 50 |
| 2. Total reaction effluent having monobutenylamines removed therefrom | 60 |
| 3. Higher boiling residue, i.e., total reaction effluent having the mono, di, and tributenylamines fractionated therefrom | 65 |

[2] Free from unreacted ammonia and butadiene. Typical of this effluent is a density at 20° C. of 0.8415, a heat of combustion of 18,670 B.t.u./lb., a viscosity of 3.1 centistokes at 25° C., and a viscosity of 121 centistokes at −40° C.

A portion of the total reaction effluent was extracted with 6 N hydrochloric acid to remove materials of sufficient basicity to form water-soluble hydrogen chlorides. The remaining unextracted product material, unreactive with hydrogen chloride to form water-soluble hydrogen chlorides, and containing not more than 5 percent nitrogen, was found to comprise weakly basic amines, i.e., of low basicity, the boiling range of which was from 80° C. at 24 mm. to 242° C. at 0.4 mm. Typical characteristics of this fraction of weakly basic amines are a density of about 0.942 at 20° C., and a viscosity of about 936 centistokes at 25° C. This type product material is referred to hereafter as "weakly basic" amine product.

The weakly basic material so produced was hypergolic per se and was also hypergolic when diluted with pure grade n-heptane. Hypergolicity tests employing red fuming nitric acid conducted according to the procedure already described herein showed the weakly basic product material to be hypergolic when diluted with as high as 40 percent pure n-heptane.

*Example III*

A butenylamine reaction product was prepared in a 1.4 liter autoclave by amination in liquid phase of 1,3-butadiene with ammonia under conditions to produce the maximum amount of the weakly basic product material described in Example II. The total product effluent from this reaction, free from unreacted butadiene and from unreacted ammonia, had a viscosity at 77° F. of 98.9 centistokes, a pour point of −40° F., and a density of 0.904 at 60° F. Conditions of the reaction and amounts of materials charged were as follows:

| Materials charged: | Amount charged, grams |
|---|---|
| 1,3-butadiene | 176 |
| Ammonia | 178 |
| Sodium hydride (catalyst) | 10 |

The reaction was conducted at 107–117° F. under the autogenic pressure of the reactants. The butadiene reactant was intermittently injected into an agitated catalyst-ammonia mixture over a period of 2 hours and 55 minutes. Distillation characteristics of the reaction effluent were as follows:

| Fraction | Boiling Range | Weight, grams |
|---|---|---|
| No monobutenylamine produced | | |
| No dibutenylamine produced | | |
| Tributenylamine | 98 to 121°C. at 22 mm | 4 |
| Higher boiling material [1] | 121° C. at 22 mm. to 195° C. at 2 mm | 45 |
| Residue | | 38.6 |

[1] Contains higher boiling amines including weakly basic amine product.

The total reaction effluent free of butadiene and ammonia from the above described run was hypergolic per se and was also hypergolic when diluted with pure grade n-heptane. Hypergolicity tests of this total effluent were conducted according to the procedure described in Example I using both red and white fuming nitric acids as oxidants. Results are recorded in the following table:

| Material | Oxidant | Maximum dilution percent n-heptane |
|---|---|---|
| Total reaction effluent | Red Fuming Nitric Acid | 65 |
| Do | White Fuming Nitric Acid | [1] 30 |

[1] Viscosity of n-heptane solution is 33.9 centistokes at 77° F.

*Example IV*

Spontaneous ignition was obtained with 0.13 cc. of an admixture of 10 volume percent n-heptane and 90 volume percent of total butenylamine reaction effluent formed in accordance with the amination procedure of Example III and free from unreacted ammonia and unreacted butadiene was dropped into a body of 0.3 cc. of nitric acid-sulfuric acid mixture consisting of 89 volume percent white fuming nitric acid and 11 volume percent sulfuric acid containing 95 weight percent $H_2SO_4$.

I claim:

1. A method for imparting immediate thrust to a rocket comprising introducing separate streams of oxidizer fuel components of a bipropellant into the combustion chamber of the rocket motor in contact with each other therein in proportions to produce spontaneous ignition, said fuel component being at least one unsaturated organic amine selected from the group consisting of compounds having the following structural characteristics

wherein $R_1$ is a radical selected from the group consisting of alkenyl, arylalkenyl, alkaryl-alkenyl, cycloalkyl-alkenyl, cycloalkenyl-alkenyl, hydrogen, aryl and alkaryl, $R_2$ is a radical selected from the group consisting of alkenyl, aryl-alkenyl, alkaryl-alkenyl, cycloalkyl-alkenyl, cycloalkenyl-alkenyl and hydrogen, and $R_3$ is a radical selected from the group consisting of alkenyl, aryl-alkenyl, alkaryl-alkenyl, cycloalkyl-alkenyl and cycloalkenyl-alkenyl, each said alkenyl radical containing at least 4 carbon atoms and wherein the total of carbon atoms does not exceed 25.

2. The method of claim 1 wherein said organic amine is monobutenylamine.

3. The method of claim 1 wherein said organic amine is dibutenylamine.

4. The method of claim 1 wherein said organic amine is tributenylamine.

5. The method of claim 1 wherein said organic amine is obtained and used as a total amine product of reaction of catalytic amination of 1,3-butadiene with ammonia, the said amination being effected at a temperature in the range 50 to 500° F. in the presence of a catalyst selected from the group consisting of an alkali metal hydride and sodamide.

6. The method of claim 1 wherein said organic amine has a boiling point within the range of 121° C. at 22 mm. Hg to 195° C. at 2 mm. Hg.

7. The method of claim 1 wherein said organic amine is unreactive with HCl to produce a water-soluble hydrochloride and has a boiling point within the range of 121° C. at 22 mm. Hg to 195° C. at 2 mm. Hg.

8. The method of claim 1 wherein said organic amine has a boiling point with the range 80° C. at 24 mm. Hg to 242° C. at 0.4 mm. Hg and is unreactive with hydrogen chloride to produce a water-soluble hydrochloride.

9. The method of claim 1 wherein said organic amine is a total amine product of catalytic amination of 1,3-butadiene with ammonia, free of monobutenylamine, the said amination being effected at a temperature in the range 50 to 500° F. in the presence of a catalyst selected from the group consisting of an alkali metal hydride and sodamide.

10. The method of claim 1 wherein said organic amine is a total amine product of catalytic amination of 1,3-butadiene with ammonia, free of monobutenylamine and dibutenylamine, the said amination being effected at a temperature in the range 50 to 500° F. in the presence of a catalyst selected from the group consisting of an alkali metal hydride and sodamide.

11. The method of claim 1 wherein said organic amine is a total amine product of catalytic amination of 1,3-butadiene with ammonia, free of mono-, di-, and tributenylamine, the said amination being effected at a temperature in the range 50 to 500° F. in the presence of a catalyst selected from the group consisting of an alkali metal hydride and sodamide.

12. A method of claim 1 wherein said oxidizer is selected from the group consisting of hydrogen peroxide, liquid oxygen, nitric acid, nitric acid containing a minor proportion of nitrogen dioxide, and nitric acid containing a minor proportion of sulfuric acid.

13. A method of claim 1 wherein said oxidizer is employed in a stoichiometric ratio to said organic amine within the range of 0.5:1 to 6:1.

14. A method of claim 1 wherein said organic amine is dissolved in a hydrocarbon non-hypergolic combustible liquid.

15. A method of claim 14 wherein said liquid is a n-paraffin hydrocarbon.

16. A method according to claim 15 wherein said liquid is n-heptane.

17. A method according to claim 1 wherein at least one of the R's selected is an alkenyl radical.

18. A method according to claim 17 wherein the alkenyl radical is butenyl.

References Cited in the file of this patent

UNITED STATES PATENTS

| | | |
|---|---|---|
| 2,474,183 | King | June 21, 1949 |
| 2,489,051 | Sayward et al. | Nov. 22, 1949 |
| 2,501,509 | Gresham et al. | Mar. 21, 1950 |
| 2,573,471 | Malina et al. | Oct. 30, 1951 |

OTHER REFERENCES

Beilstein: "Handbuch der Organischen Chemie," 1st edition, Band IV, pages 220 and 221, Julius Springer, Berlin (1922).